United States Patent [19]
Campbell

[11] Patent Number: 5,687,943
[45] Date of Patent: Nov. 18, 1997

[54] APPARATUS FOR SUPPORTING A VIDEO CAMERA AND CABLE ABOVE A WORK SURFACE

[76] Inventor: Pleasant W. Campbell, 5050 Ambassador Way, Ste. 215, Houston, Tex. 77056

[21] Appl. No.: 588,717

[22] Filed: Jan. 19, 1996

[51] Int. Cl.⁶ .............................. A47H 1/10; G03B 17/00
[52] U.S. Cl. ................... 248/331; 248/125; 248/280.11; 248/330.1; 352/243
[58] Field of Search ..................... 248/331, 330.1, 248/280.11, 297.11, 214, 182.1, 922, 317, 325, 226.11; 354/81, 293

[56] References Cited

U.S. PATENT DOCUMENTS

| | | | |
|---|---|---|---|
| 820,781 | 5/1906 | Hammond | 248/292.11 |
| 1,127,397 | 2/1915 | Boyajian | 248/331 |
| 3,391,890 | 7/1968 | Perbal | 248/280.11 |
| 3,489,384 | 1/1970 | Perbal | 248/280.11 |
| 3,816,646 | 6/1974 | Cinque | 178/6 |
| 4,158,489 | 6/1979 | Gottschalk | 352/243 |
| 4,474,439 | 10/1984 | Brown | 352/243 |
| 4,545,555 | 10/1985 | Koch | 248/280.11 |
| 4,577,819 | 3/1986 | Bennett | 248/280.11 |
| 5,037,053 | 8/1991 | Fox | 248/278 |
| 5,233,333 | 8/1993 | Borsuk | 340/731 |
| 5,275,364 | 1/1994 | Burger et al. | 248/122 |
| 5,318,257 | 6/1994 | Tani | 248/125 |

FOREIGN PATENT DOCUMENTS

| | | | |
|---|---|---|---|
| 2279285 | 4/1995 | United Kingdom | 248/922 |

OTHER PUBLICATIONS

Advertisement from *Rocky Mountain News*, dated Aug. 10, 1992 entitled "Device Lets Even the Legally Blind Read".

Advertisement from *This Week in Worthington*, dated Mar. 29, 1993 entitled "Magni–Cam Makes for Easy Read".

Advertisement from *Innovations, Inc.*, (no date shown) entitled "Finally, Good News for People With Low Vision" Magni–Cam™ Limited Warranty.

*Primary Examiner*—Ramon O. Ramirez
*Assistant Examiner*—Charles J. Hunter
*Attorney, Agent, or Firm*—Vaden, Eickenroht & Thompson, L.L.P.

[57] ABSTRACT

An apparatus is provided for use with a cabled video camera that transmits magnified images of an object or printed text on a work surface via a cable to a video monitor. The apparatus includes an elongated leg and an elongated arm connected at an angle to the leg for supporting the cable over the work surface, such as a desktop. Means, such as a clamp assembly, is provided for mounting the leg to the work surface in a vertically extending position for rotation about the leg's longitudinal axis to enable pivotal movement of the arm over the work surface. Means, preferably in the form of a pair of rotatable pulleys, is mounted to the arm for supporting the cable above the work surface and enabling the cable to move along the arm. In this manner, the cabled video camera may be positioned to scan objects or printed text on the work surface without cluttering the work surface with the cable.

4 Claims, 3 Drawing Sheets

APPARATUS FOR SUPPORTING A VIDEO CAMERA AND CABLE ABOVE A WORK SURFACE

BACKGROUND OF THE INVENTION

1. Field of the Invention

This invention relates to video cameras that scan an object or printed text and transmit a magnified image of the scanned object or text to a video monitor for viewing by the visually impaired or by those who work with minute or detailed objects.

2. The Related Art

There are a number of devices commercially available for providing magnified images of a scanned object or printed text. One such device, for example, is manufactured by Innovations, Inc. of Littleton, Colo. and sold under the trademark MAGNI-CAM. The MAGNI-CAM video camera consists of a miniature video camera encased in a rectangular housing equipped with a fluorescent light. A cable connects the MAGNI-CAM video cameras housing to a control panel, which transmits the video signal to a video monitor. The MAGNI-CAM video camera camera housing is typically scanned over printed text by the user to produce a magnified image of the text on the monitor.

One problem inherent in the use of the MAGNI-CAM video camera is that the camera housing and the cable extending therefrom tend to clutter the work surface and interfere with other documents or objects on the work surface. For example, when using the MAGNI-CAM video camera for Business purposes there will undoubtedly be various stacks of documents and objects such as telephones, staplers, tape dispensers, etc. atop the user's desk. Experience has shown that use of the MAGNI-CAM video camera in such an environment results in the cable knocking objects off the desktop and upsetting or scattering stacks of papers on the desk as the camera housing is moved over a document. Also, when the user's desktop or other work surface becomes crowded, there is no convenient means of moving or storing the MAGNI-CAM camera housing out of the way but within arm's reach when not in use.

Examples of apparatuses for supporting and positioning video cameras include U.S. Pat. Nos. 4,158,489, 4,474,439, 5,275,364, and 5,318,257. The No. '489 patent discloses a body-mounted camera support assembly not suitable for use on a work surface such as a desktop. The Nos. '439 and '257 patents describe camera support mechanisms that exhibit a substantial "footprint" requiring substantial space on the work surface, thus contributing to the problem of cluttering the work surface. The No. '364 patent discloses a pole-type camera support that is not freely manipulable, and is therefore inadequate for conveniently scanning text across a page. In summary, none of these patents disclose a camera supported by a cable, so the problem of a cable cluttering a work surface is not identified or addressed.

In response to the above-described deficiencies in the prior art, it is an object of the present invention to provide an apparatus that facilitates the use of a cabled video camera by supporting the cable over a work surface free from interference with the objects on the work surface.

It is a further object of the present invention to provide an apparatus that will cause the cabled video camera to automatically move to a suspended position above the work surface and out of the way when not in use.

SUMMARY OF THE INVENTION

The objects described above, as well as other objects and advantages, are achieved by an apparatus intended for use with a cabled video camera, such as the MAGNI-CAM video, that transmits magnified images of an object or printed text on a work surface via a cable to a video monitor. The apparatus includes an elongated leg and an elongated arm connected at an angle to the leg for supporting the cable over the work surface, such as a desktop. Means, such as a clamp assembly, is provided for mounting the leg to the work surface in a vertically extending position for rotation about the leg's longitudinal axis to enable pivotal movement of the arm over the work surface. Means, preferably in the form of a pair of rotatable pulleys, is mounted to the arm for supporting the cable above the work surface and enabling the cable to move along the arm. In this manner, the cabled video camera may be positioned to scan objects or printed text on the work surface.

In a preferred embodiment, the end of the cable opposite the camera is connected to and suspends a counterweight beneath the end of the arm adjacent the leg. The counterweight has a weight greater than the weight of the camera whereby the cable is pulled in one direction along the arm and the camera is constantly urged upwardly by the force in the cable. The camera is thus positionable over the work surface by pivotal movement of the arm and by applying force to the camera to overcome the excess weight of the counterweight and pull the cable in the other direction along the arm. Means, such as a clip, is also provided for limiting movement of the cable in the one direction along the arm whereby the upward movement of the camera is limited to a suspended position above the work surface to which the camera will return when not in use. In this embodiment, the counterweight is a control panel that provides power to the camera and completes the transmission of the video signal to the monitor.

BRIEF DESCRIPTION OF THE DRAWINGS

In the drawings, wherein like reference characters are used throughout to describe like parts.

DETAILED DESCRIPTION OF THE PREFERRED EMBODIMENT

Figure 1:
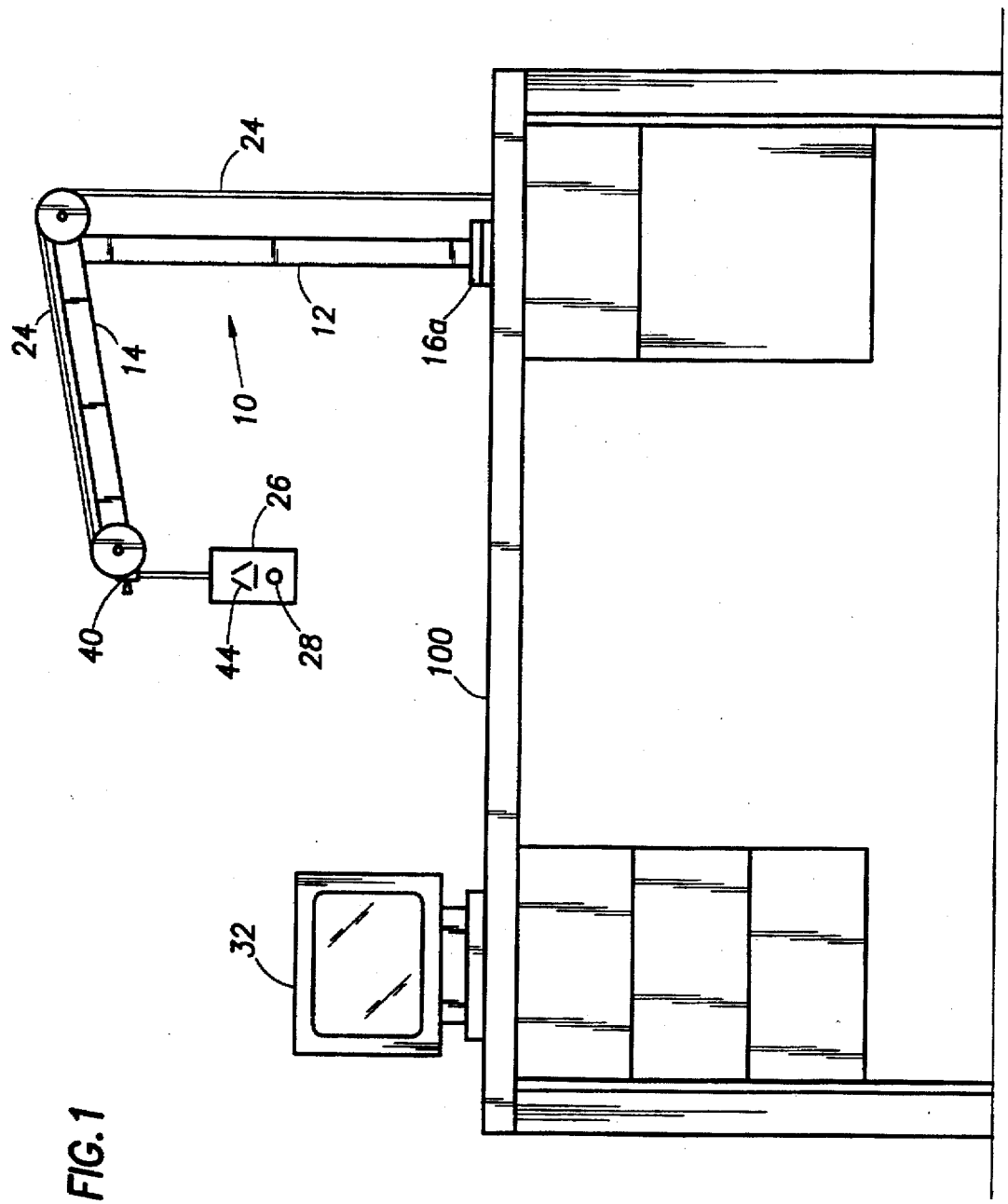
FIG. 1 is a perspective view of an apparatus according to the present invention positioned above a desktop with the video camera in a non-functioning position.
Figure 2:
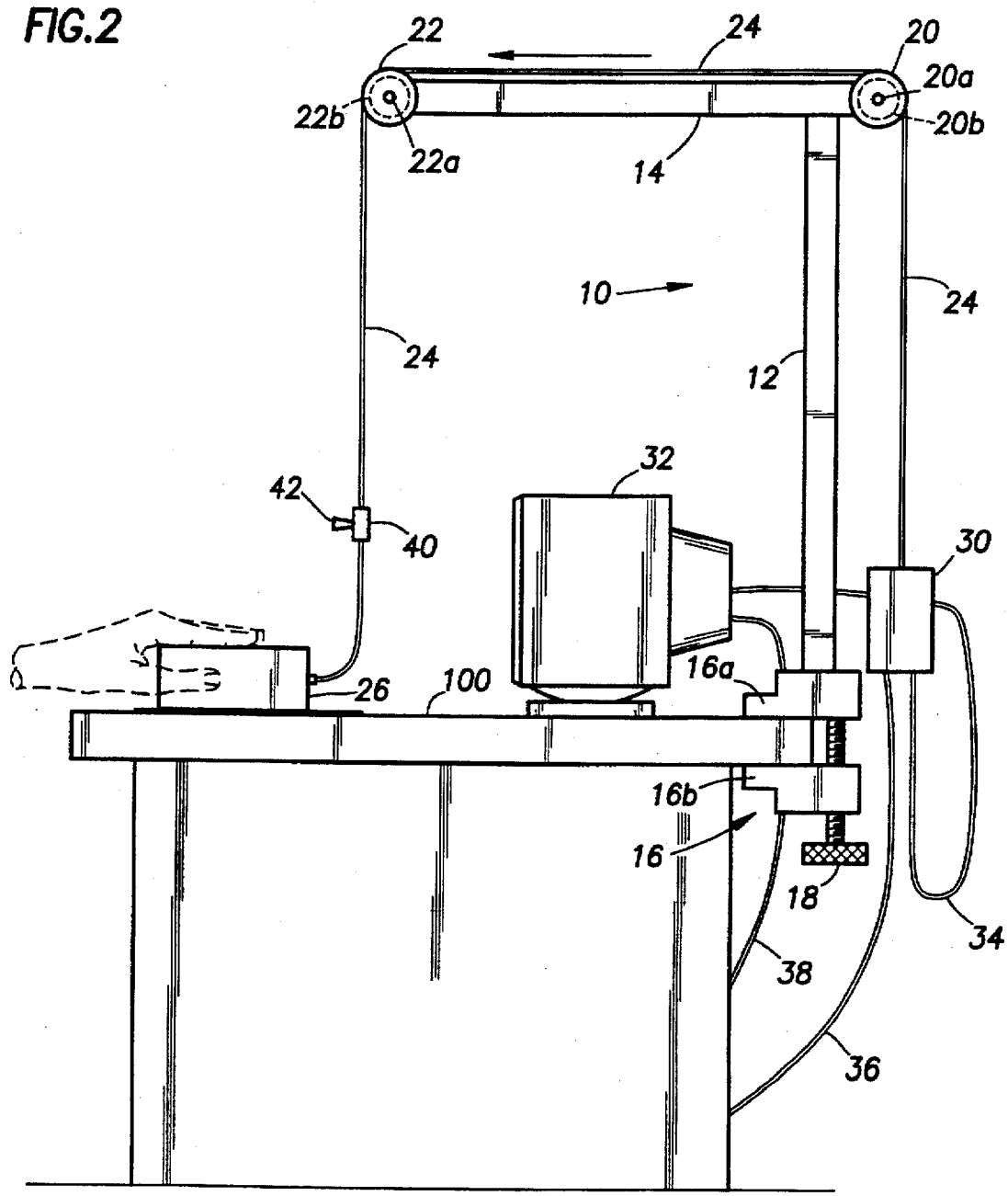
FIG. 2 is a side elevational view of the apparatus with the camera in use to scan a document on the desktop.
Figure 3:
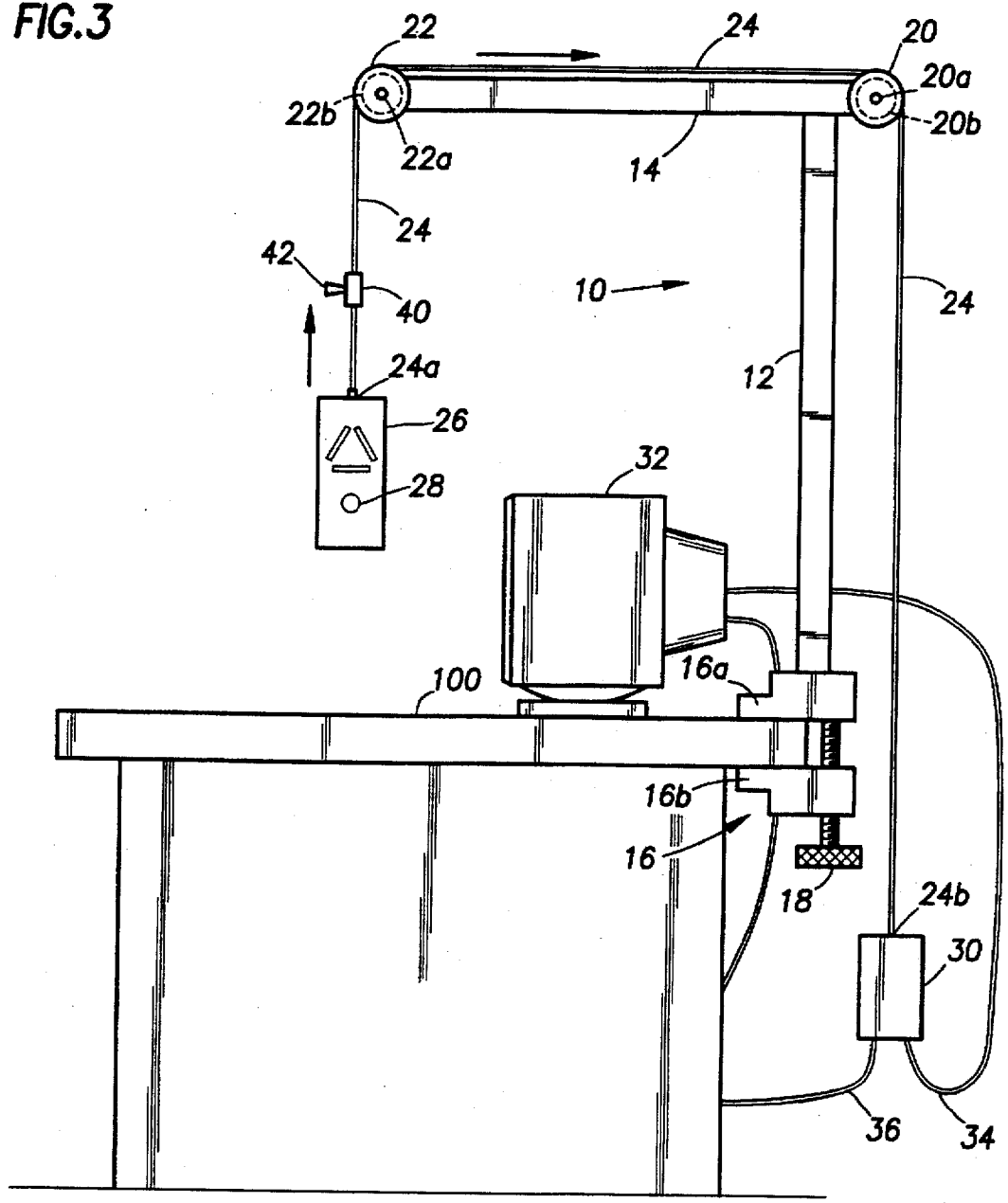
FIG. 3 a side elevational view with the camera in motion towards its non-functioning position.

The preferred embodiment of the apparatus, referred to generally in FIGS. 1–3 as 10, includes elongated leg 12 and elongated arm 14 connected adjacent one of its ends at a 90° angle to the upper end of the leg. The other end of arm 14 extends for pivotal movement over desktop 100 by the rotation of leg 12.

As shown in FIGS. 2 and 3, leg 12 is clamped in a vertically extending position for rotation relative to desktop 100 by clamping assembly 16. The clamping assembly includes upper and lower jaws 16a and 16b whose relative movement is controlled by screw 18. Leg 12 is mounted for rotation about its longitudinal axis within bearings (not shown) in upper jaw 16a. This permits the outer end of arm 14 to be pivoted in an arc over the desktop.

Pulleys 20 and 22 are mounted at the ends of arm 14 about pins 20a and 22a, respectively, for rotation relative to the arm. The pulleys carry video and power cable 24 in grooves 20b and 22b above desktop 100 for movement along arm 14.

Video and power cable 24 has first end 24a suspending camera 26 beneath the outwardly extending end of arm 14, and second end 24b suspending control panel 30 beneath the end of arm 14 nearest leg 12. Control panel 30 acts as a counterweight, and has a weight greater than the weight of camera 26 whereby cable 24 tends to be pulled in one direction along arm 14, to the right as shown in FIG. 3. Thus, camera 26 is constantly urged upwardly by the force in cable 24 from control panel 30, as indicated by the arrow shown in FIG. 3.

Cable 24 terminates within control panel 30, wherein it is connected to separate video and power cables 34 and 36. Video cable 34 completes the transmission of the video signal magnified by lens 28 of camera 26 to monitor 32. Power cable 36 is connected to a standard wall outlet (not shown), for providing electrical power to video monitor 32. Control panel 30 also includes an electrical switch (not shown) for energizing and de-energizing the video camera.

Camera 26 is positionable over desktop 100 by pivotal movement of arm 14, and by applying force to the camera to overcome the excess weight of control panel 30. In this fashion, cable 24 is pulled in the other direction along the arm, to the left as shown in FIG. 2. Such movement of camera 26 enables the user to scan and transmit magnified images of objects or printed text on the desktop to monitor 32 via cables 24 and 34 without cluttering the work surface with anything other than the camera.

For the times when the camera is not in use, means are provided for limiting upward movement of the camera, induced by the weight of control panel 30, in the form of cable clip 40 which is spring-loaded to close about and frictionally engage cable 24. Cable clip 40 is equipped with twin handles 42 which are squeezed by the user to open the clip, and adjust its position along the cable. As the camera is pulled upwardly, clip 40 will engage pulley 22 preventing further movement of cable 24 along arm 14. In this fashion, the upward movement of camera 26 is limited to a suspended position at a selected height above the work surface, as shown in FIG. 1, to which the camera will return when not in use. Thus, the video camera automatically assumes an out-of-the-way position until needed by the user.

The objects described above, as well as other objects and advantages, are achieved by an apparatus intended for use with a video camera that transmits magnified images of an object or printed text via a cable to a video monitor for enhanced viewing, in the form of an apparatus for suspending the cable and the video camera above a work surface such as a desktop for scanning an object or printed text placed on the work surface free from interference with the cable.

From the foregoing it will be seen that this invention is well adapted to attain all the ends and objects herein set forth, together with other advantages which are obvious and inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as being illustrative and not in a limiting sense.

What is claimed is:

1. For use with a video camera means including a video camera that transmits magnified images of an object or printed text on a work surface elevated above a floor via a cable to a video monitor, an apparatus for supporting the cable above the work surface, comprising:

an elongated leg;

an elongated arm connected at an angle to said leg;

means for mounting said leg to the elevated work surface in a vertically extending position rotatable about its longitudinal axis to pivotally move said arm over the work surface;

means mounted to said arm for supporting the cable above the work surface and enabling the cable to move along the arm so that the camera may be positioned to scan objects or printed text on the work surface.

2. The apparatus of claim 1 wherein said cable supporting and movement enabling means includes a pair of pulleys respectively mounted at the ends of said arm for rotation relative to the arm.

3. A cable-supporting apparatus for use with a video camera means including a video camera that transmits magnified images of an object or printed text on a work surface elevated above a floor via a cable to a video monitor, the video camera means further including a control panel of a weight greater than that of the camera connected to the cable intermediate the camera and monitor, said apparatus comprising:

an elongated leg;

an elongated arm having first and second ends and connected at an angle to said leg proximate the second end of said arm, the first end of said arm being distal to said leg;

adjustable clamping means for mounting said leg to the elevated work surface in a vertically extending position rotatable about its longitudinal axis to permit pivotal movement of said arm over the work surface;

means mounted on said arm for supporting the cable above the work surface and enabling the cable to move along the arm so that the camera may be positioned to scan objects or printed text in different positions on the work surface, said supporting means suspending the camera via the cable beneath the first end of said arm and suspending the control panel via the cable beneath the second end of said arm whereby the excess weight of the control panel causes the cable to be pulled in one direction along said arm and the camera is moveable over the work surface by applying force to the camera to overcome the excess weight of the control panel and pull the cable in the other direction along the arm.

4. The apparatus of claim 3 further comprising means for limiting movement of the cable in the one direction along said arm whereby the upward movement of said camera is limited to a suspended position above the work surface to which the camera will return when not in use.

* * * * *

UNITED STATES PATENT AND TRADEMARK OFFICE
CERTIFICATE OF CORRECTION

PATENT NO. : 5,687,943
DATED : November 18, 1997
INVENTOR(S) : Pleasant W. Campbell It is certified that error appears in the above-indentified patent and that said Letters Patent is hereby corrected as shown below:

Col. 1, line 20, change "cameras" to --camera--;
Col. 1, line 22, change "video camera camera" to --camera--;
Col. 2, line 2, after "video" insert -- camera --;
Col. 2, line 44, after "FIG. 3" insert --is--.

Signed and Sealed this

Twenty-sixth Day of May, 1998

Attest:

BRUCE LEHMAN

Attesting Officer         Commissioner of Patents and Trademarks